United States Patent [19]

Onishi

[11] 4,294,372

[45] Oct. 13, 1981

[54] SMALL-SIZED CONTAINER CAPABLE OF MIXING MORE THAN TWO COMPONENTS AT A PREDETERMINED MIXING RATIO

[75] Inventor: Shigeru Onishi, Kanazawa, Japan

[73] Assignee: Nippon Clean Engine Laboratory Co., Japan

[21] Appl. No.: 89,041

[22] Filed: Oct. 29, 1979

[30] Foreign Application Priority Data

Nov. 3, 1978 [JP] Japan ................ 53-135949

[51] Int. Cl.³ .................. B65D 1/24; B65D 88/56
[52] U.S. Cl. .................... 220/20; 220/86 R; 137/576
[58] Field of Search .......... 220/20, 20.5, 86 R; 137/571, 576

[56] References Cited

U.S. PATENT DOCUMENTS

| | | | |
|---|---|---|---|
| 2,631,608 | 3/1953 | Rosenberg | 220/86 R |
| 2,826,338 | 3/1958 | Davis | 220/20 |
| 2,896,809 | 7/1959 | Metzger | 220/20 |
| 2,926,695 | 3/1960 | Thomas | 137/576 |
| 2,945,509 | 7/1960 | Tuttle | 137/576 |
| 2,971,673 | 2/1961 | Beck | 220/86 R |
| 2,986,162 | 5/1961 | Spoxarth | 137/571 |
| 3,316,933 | 5/1967 | Ajero | 137/576 |
| 3,396,875 | 8/1968 | Finch | 220/86 R |

Primary Examiner—George E. Lowrance
Attorney, Agent, or Firm—Steinberg & Raskin

[57] ABSTRACT

Container apparatus for storing at least two components and for mixing the same according to a predetermined ratio includes a container in whose interior at least two chambers are defined, each chamber having a hollow interior space therein. The ratio of the cross-sectional areas of the interior spaces of the at least two chambers is constant at any level when the container is oriented in an ordinary or storage position. An opening is provided for each chamber so that a respective component can be charged into the hollow interior space defined thereby. The hollow interior spaces of the various chambers are fluidly interconnected with each other.

1 Claim, 5 Drawing Figures

SMALL-SIZED CONTAINER CAPABLE OF MIXING MORE THAN TWO COMPONENTS AT A PREDETERMINED MIXING RATIO

BACKGROUND OF THE INVENTION

This invention relates generally to containers and, more particularly, to containers for mixing at least two components according to a predetermined mixing ratio and which are of a relatively small size so as to facilitate the handling and transportation thereof.

The mixing of two or more components is frequently necessary in various applications. For example, it is often necessary to mix gasoline and lubricating oil, a chemical and diluting water, and in general different liquid components according to a predetermined component ratio.

In the past, such mixing has been accomplished utilizing graduated cylinders or the like in which appropriate quantities of the components are measured, separate mixing containers into which the previously measured components are delivered and a subsequent stirring or mixing operation. Such conventional techniques are rather time consuming, subject to error and cumbersome in that it is necessary to carry several pieces of equipment, e.g., measuring instruments, mixing containers, etc., to the location at which the mixing operation is to be performed.

SUMMARY OF THE INVENTION

Accordingly, one object of the present invention is to provide a new and improved container apparatus which is capable of mixing at least two components according to a predetermined mixing ratio without necessitating the use of any separate measuring instruments such, for example, as graduated cylinders or the like.

Another object of the present invention is to provide new and improved container apparatus as described above which is of a size which facilitates the handling and transport thereof.

Briefly, in accordance with the present invention, these and other objects are attained by providing container apparatus including at least two chambers, each having a hollow interior space defined therein, the ratio of the cross-sectional areas of the hollow interior spaces of the respective chambers being substantially constant at any level of the apparatus when the latter is oriented in its normal or storage position, i.e., when the container apparatus is so oriented that the respective components are isolated from each other. An opening is associated with each of the respective chambers through which each respective component can be charged into the hollow interior space of the respective chamber. The hollow interior spaces of the various chambers are mutually interconnected with each other for allowing the respective components to become mixed.

The at least two chambers are defined in one embodiment of the invention by a container in which a partition wall is provided. In another embodiment, one or more separate containers are located and fixed within a larger container.

The openings through which the hollow interior spaces of the respective chambers are charged with the respective components to be mixed are preferably located at the upper region of each chamber and a respective lid is provided for each of the openings which is adapted to selectively open and close the same.

The hollow interior spaces of the respective chambers are mutually interconnected by means of a connecting port or a connecting pipe. Such port or pipe preferably communicates with the respective hollow interior chamber spaces at their upper regions.

It is understood that although the container apparatus of the present invention finds its greatest application in connection with the mixing of liquid components, other types of components, e.g., powder or granular components, can be mixed utilizing the apparatus of the present invention.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which.

DESCRIPTION OF THE PREFERRRED EMBODIMENTS

Figure 1:
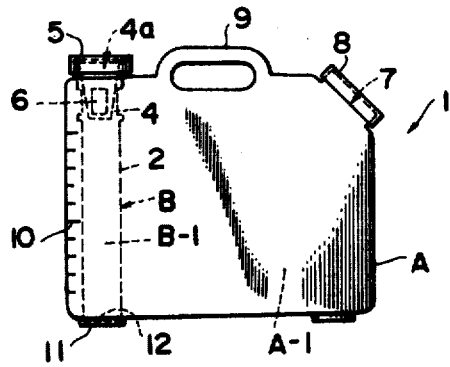
FIG. 1 is a side elevational view of one embodiment of the present invention.

Referring now to the drawings wherein like reference characters designate identical or corresponding parts throughout the several views and first to FIG. 1, container apparatus, generally designated 1, comprises a first container or chamber A in which a second container or chamber B is fixedly located. The first chamber A defines a hollow interior space A-1 which includes all the interior volume thereof excepting that portion of the volume taken up by the second chamber B whereas the second chamber B defines a hollow interior space B-1. The second chamber B is defined by a separate smaller container 2 which in the illustrated embodiment has a cylindrical shape but which may have any appropriate configuration according to the features of the invention as described below.

As seen in FIG. 1, the container apparatus 1 is oriented in its normal or storage position which will become more apparent when the description of the operation of the invention is considered. According to the invention, the ratio of the cross-sectional areas of the hollow interior spaces A-1, B-1 of the first and second chambers A, B, respectively is constant at any level throughout the apparatus. For example, the ratio of the areas of the first and second chambers A,B through a planar, horizontal section at any vertical level of the apparatus can be 25:1.

A funnel 4 extends through an opening formed in the top wall of chamber A into the upper region of the container 2 and is supported in this position by a support 3. The funnel 4 defines an entrance opening 4a into the interior space B-1 and a first lid 5 is provided which is adapted to be fixed over the entrance opening 4a, such as by cooperating threads formed on the support 3 and lid 5 to close the opening 4a when desired.

The funnel 4 has formed at its lower end portion a connecting port 6 which communicates with the upper end region of the wall of container 2 in a manner such that the connecting port 6 provides communication between the hollow interior space A-1 of the first chamber A and the hollow interior space B-1 of the second chamber B.

An opening 7 is provided in the first chamber A at the upper region of the hollow interior space A-1. A second lid 8 is removably affixed, such as by threads, over opening 7 so that the latter can be selectively closed. A handle or grip 9 is formed, preferably integrally, at the top of first chamber A so that the apparatus 1 can be easily held and transported by hand. Finally, level graduations or indicia 10 are provided on the first chamber A which extend vertically throughout its height.

In order to fix the container 2 within the first chamber A, the latter has a recessed portion 11 formed in its lower wall which is adapted to snugly receive the outer periphery of the bottom portion 12 of container 2. In order to compensate for the increased volume presented by the recessed portion 11, the bottom portion 12 of the container 2 has an increased wall thickness.

It will be apparent to those skilled in the art from the above that in the embodiment of the invention illustrated in FIG. 1, the small container 2 which defines the second chamber B can be either detachable from the first container or chamber A or, alternatively, may be fixed thereto. In the case where the small container 2 is detachable, it is understood that the same can be replaced by a plurality of smaller containers such, for example, as scaled graduated cylinders, each such container having a different ratio of its horizontal corss-sectional area to that of the first chamber A so that three or more components can be mixed according to a predetermined mixing ratio.

The first and second containers are preferably formed of a transparent or translucent material so that visual access to the hollow interior spaces defined thereby is provided.

A description of the operation of the embodiment of the invention illustrated in FIG. 1 follows and in this connection the invention is utilized in connection with the preparation of a mixture fuel for a two cycle internal combustion engine. In this application the ratio of the cross-sectional areas of the first chamber A and the second chamber B is preferably 25:1. The first and second chambers A,B are filled through the respective openings 7,4a to the same level with gasoline and lubricating oil, respectively. After the respective chambers are so filled, the openings 7,4a are closed by the lids 8,5, respectively. The container apparatus 1 is then turned upsidedown and agitated whereupon the lubricating oil in the chamber B flows into the chamber A through the connecting port 6 provided at the upper region of chamber B whereupon the components are mixed within the chamber A. The gasoline and lubricating oil are uniformly mixed to form a homogeneous mixture by the mixing action caused by the oscillation or agitation of the apparatus 1.

It is understood that although the above description of the operation of the invention has been in connection with the mixing of gasoline and lubricating oil, the invention can equally be applied to the mixing of other kinds of liquid or other components. Further, the ratio of the mixing volumes can easily be changed by changing the ratio of the horizontal cross-sectional area of chambers A,B so that any desired mixing ratio can be easily obtained.

Figure 3:
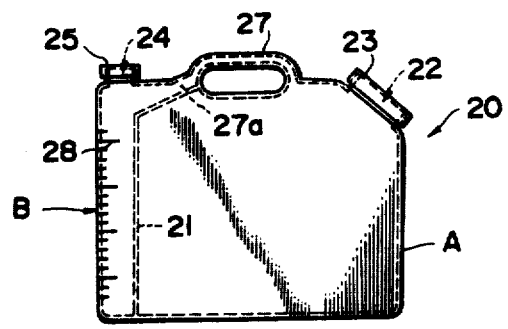
FIG. 3 is a side elevation view of still another embodiment of the present invention.
Figure 2:
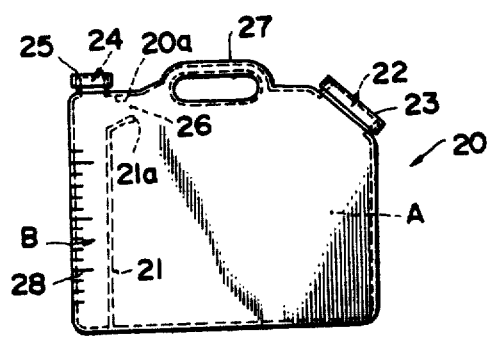
FIG. 2 is a side elevation view of another embodiment of the present invention.

Referring now to the embodiments of the invention illustrated in FIGS. 2 and 3, both embodiments are similar in that container apparatus 20 has its interior divided by a partition wall 21 into a first chamber A and a second chamber B. In each embodiment, the ratio of the cross-sectional area of the first and second chambers A,B is constant over the entire height of the container apparatus 20, i.e., at any level from the bottom thereof when the same is located in the illustrated storage or normal position. The first chamber A is provided with an opening 22 to which a lid 23 can be attached to close the latter when desired. The second chamber B is also provided with a opening 24 and a lid 25 for closing the same. The lids 23 and 25 can be detachably secured to the openings 22,24 respectively, by any known arrangement, such as by screw threads. Level graduations or indicia 28 are provided over the vertical height of the container apparatus 20 in a manner similar to the indicia 10 of FIG. 1.

Referring to FIG. 2, the partition wall 21 is connected to the container apparatus 20 along its bottom and side edges and has an upper end 21a which is spaced below the upper wall 20a of the container apparatus 20. The space defined between the upper end 21a of the partition wall 21 and the wall 20a of the container apparatus 20 defines a connecting port 26 which interconnects the hollow interior spaces of first and second chambers A,B. A handle or grip 27 is provided at the top of the container apparatus 20 in a manner similar to the FIG. 1 embodiment.

Referring to the embodiment of the invention illustrated in FIG. 3, the handle or grip 27 is formed in a manner such that a hollow passage extends therethrough. The partition wall 21 has an extended portion which intersects the inner wall of the handle 27. In this manner, the passage formed through the handle 27 and the communicating space defined by the extended portion of the partition wall 21 defines a connecting pipe 27a whose ends open into the hollow interior spaces defined by the chambers A, B. The embodiment of the invention illustrated in FIG. 3 is otherwise identical to the embodiment illustrated in FIG. 2.

Figure 4:
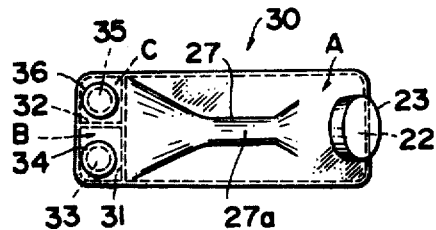
FIG. 4 is a plan view of yet another embodiment of the present invention.

Referring now to FIG. 4, another embodiment of the present invention is illustrated which can be used, for example, in the preparation and mixing of an agricultural chemical. This embodiment of the invention is similar to that described above in connection with FIG. 3 except that the second chamber B in FIG. 3 is replaced by second and third chambers B,C in the FIG. 4 embodiment. More particularly, a partition wall 31 extends across the depth of the container apparatus 30 in a manner similar to the partition wall 21 of the FIG. 3 embodiment. A second partition wall 32 is provided which defines together with partition wall 31 the second and third chambers B, C. Lids 34, 36 are provided for closing the openings 33, 35, respectively, formed in the second and third chambers B, C. Again, these lids are secured to their respective openings by conventional means, such as by screw threads.

In the use of the embodiment of the invention illustrated in FIG. 4 in connection with the preparation of an insecticide, for example, the lid 23 is first removed and diluting water is poured into the first chamber A through the opening 22. In a similar manner, a developing agent and an insecticide are charged into the second and third chambers B,C, respectively. The chambers A,B,C are filled with their respective components to equal heights and, after such charging, the openings 22,23 and 35 are closed by the lids 23, 34 and 36, respectively.

As in the case of all of the above-described embodiments, the ratio of the cross-sectional areas of the chamber A,B and C is constant throughout the height of the container apparatus 30, i.e., at any level from the bottom. After the chambers are filled with the respective components, the container is turned upside down whereupon the agent and insecticide contained in the second and third chambers B, C flow into the first chamber A through the connecting pipe 27a formed in the handle 27. The three components are uniformly mixed by the stirring and mixing action caused by the agitation of the container 30.

The present invention provides significant advantages in connection with the mixing of components in a predetermined ratio. For example, when a relatively powerful chemical, such as an agricultural insecticide, was prepared in the past, a crude method was utilized wherein separate mixing buckets and measuring containers were required. Since the measuring and mixing process of such potent chemicals involved danger to the personnel preparing the same, the mixing proportions of the respective components were often inaccurate. For example, in some cases, the chemical may have been overly diluted to reduce the harmful effect thereof or, in other cases, the chemical may have been prepared with an excessive amount of insecticide which would damage the agricultural growth. Further, the conventional mixing methods involved a danger of the personnel being splashed with the chemical during the stirring and mixing step. By the present invention, however, these disadvantages are completely overcome. Thus, it is a simple matter to pour each component into its respective chamber and the amounts of such respective components are easily determined since it is only necessary to be sure that the components fill the respective chambers to the same height. In this manner, the respective proportions of the components in the final mixture is always the same. The mixing operation itself is accomplished within a completely closed container which is completely insulated or isolated from the ambient atmosphere in order to insure both a safe mixing method and a highly sanitary condition.

Figure 5:
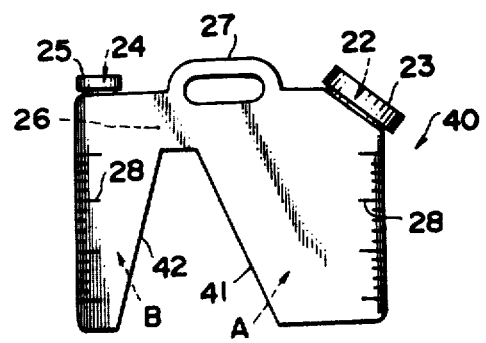
FIG. 5 is a side elevation view of still yet another embodiment of the present invention.

Turning now to the embodiment of the invention illustrated in FIG. 5, the container apparatus 40 is itself divided into a first chamber A and a second chamber B by means of partition walls 41,42. In this embodiment, the partition walls 41, 42 comprise first and second portions, respectively, of the bottom wall of the container apparatus 40. Thus, the partition walls 41,42 extend upwardly towards each other and are interconnected at a location which is spaced below the upper wall of the container apparatus in a manner such that the space defined between the location at which the partition walls 41,42 are interconnected and the upper container wall constitutes the connecting port 26 which interconnects the chamber A,B.

The angle at which the partition walls 41, 42 extend are such that the ratio of the cross-sectional area of the two chambers A,B is constant over the height of the container apparatus in the same manner as in the cases of the previously discussed embodiment. The FIG. 5 embodiment of the invention has been found particularly suited for use in connection with mixing small amounts of components.

In all other respects, the FIG. 5 embodiment of the invention is substantially identical to the embodiment of the invention discussed above in connection with FIG. 2 and corresponding parts have been designated by identical reference numerals.

Thus, in accordance with the present invention, container apparatus is provided which defines at least two chambers, the ratio of the cross-sectional areas of which is maintained constant over the entire height of the container apparatus, i.e., at any level from the bottom thereof. It is seen, therefore, that even when the container apparatus contains fuel which has already been mixed with lubricating oil, for example, it is possible to prepare additional fuel mixture by first equalizing the levels of the fuel mixture in both chambers A,B, charging the respective chambers A,B to the same level with gasoline and lubricating oil, and then turning the container apparatus upside down and agitating the same so as to mix the liquids in chambers A,B with each other.

It is understood that although the size of the container apparatus is not limited, it is desirable that the same have a size which facilitates the transport thereof by hand. In the case where the apparatus is used in connection with the preparation of a fuel mixture as described above, it is desirable to provide that the size of the oil receiving chamber be sufficient to receive the entire contents of one can of oil. This is preferred since it is well known that once an oil can is open, dust and other contaminant particles can deteriorate the residual oil left in the can. It is therefore preferred that the oil receiving chamber of the container apparatus be of a size sufficient to permit the entire contents of the oil can to be charged thereinto.

In summary, it is seen that the present invention provides the significant advantages of having a simple construction and being easy to handle and store. Importantly, a precise measuring and mixing of the components is easily accomplished while avoiding the possibility of any breakage or loss of separate measuring equipment. Further, the apparatus of the invention provides a safe method for mixing even the most noxious substances.

Obviously, numerous modifications and variations of the present invention are possible in the light of the above teachings. Accordingly, it is understood that within the scope of the claims appended hereto, the invention may be practiced otherwise then as specifically disclosed herein.

What is claimed is:

1. Container apparatus for storing at least two components and for mixing the same according to a predetermined ratio, comprising:

means for defining at least two chambers, each chamber having a hollow interior space defined therewithin, and wherein the ratio of the cross-sectional areas of the interior spaces of said at least two chambers is substantially constant at any level of the apparatus when the latter is oriented in a storage position, said chamber defining means including a container having bottom, side and upper walls and a partition wall located within said container, said partition wall having connected to said container bottom and side walls along its bottom and side edges respectively to define said at least two chambers, said partition wall having a top edge which is spaced below the upper wall of said container, the space defined between said partition wall top edge and said upper wall of said container forming a passage interconnecting said hollow interior spaces of said at least two chambers with each other;

at least two opening means formed in said container, each opening means communicating with only a respective one of said at least two chambers when the apparatus is oriented in the storage position, whereby each respective component can be charged into the hollow interior space defined by a respective chamber through the respective openings means communicating therewith; and at least two lid members, each of said lid members being adapted to close a respective one of said openings means.

* * * * *